United States Patent
Bobye et al.

(10) Patent No.: US 9,933,263 B2
(45) Date of Patent: Apr. 3, 2018

(54) SYSTEM AND METHOD FOR LONG BASELINE ACCELEROMETER/GNSS NAVIGATION

(71) Applicant: NovAtel Inc., Calgary (CA)

(72) Inventors: Michael Bobye, Calgary (CA); Patrick Fenton, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 0 days.

(21) Appl. No.: 15/136,247

(22) Filed: Apr. 22, 2016

(65) Prior Publication Data

US 2017/0307378 A1    Oct. 26, 2017

(51) Int. Cl.
*G01C 21/12* (2006.01)
*G01C 21/16* (2006.01)

(52) U.S. Cl.
CPC ................... *G01C 21/165* (2013.01)

(58) Field of Classification Search
USPC ........................................... 701/470
See application file for complete search history.

(56) References Cited

U.S. PATENT DOCUMENTS

| | | | | |
|---|---|---|---|---|
| 6,754,584 B2 * | 6/2004 | Pinto | ........... | G01C 21/165 342/357.48 |
| 7,136,751 B2 * | 11/2006 | Pinto | ........... | G01C 21/165 342/357.31 |
| 2002/0165669 A1 * | 11/2002 | Pinto | ........... | G01C 21/165 701/408 |
| 2005/0004748 A1 * | 1/2005 | Pinto | ........... | G01C 21/165 701/470 |
| 2009/0024325 A1 * | 1/2009 | Scherzinger | ........... | G01C 21/12 702/5 |
| 2011/0068975 A1 | 3/2011 | Zietz et al. | | |
| 2017/0031032 A1 * | 2/2017 | Garin | ........... | G01S 19/44 |

OTHER PUBLICATIONS

Search Report issued in international application No. PCT/CA2016/051508, dated Mar. 15, 2017.

* cited by examiner

*Primary Examiner* — Tyler D Paige
(74) *Attorney, Agent, or Firm* — Cesari and McKenna, LLP

(57) ABSTRACT

A system and method for providing location information using a long baseline accelerometer/GNSS system. A first set of accelerometers is operatively associated with the first GNSS antenna while a second set of accelerometers is operatively associated with a second (or more) GNSS antenna. The multiple assemblies are separated by predefined distances and held rigid to each other. Accelerometer data is combined with the GNSS data to provide improved navigation and location information.

8 Claims, 4 Drawing Sheets

SYSTEM AND METHOD FOR LONG BASELINE ACCELEROMETER/GNSS NAVIGATION

BACKGROUND OF THE INVENTION

Field of the Invention

The present invention relates to global navigation satellite system (GNSS) antenna navigation systems and, more particularly, to paired inertial motion unit (IMU) and GNSS navigation systems.

Background Information

Micro-electromechanical systems (MEMS) based gyroscopes are generally relatively expensive and can be highly inaccurate due to, e.g., biases and/or poor stability. Accelerometers for use in inertial motion units (IMUs) have been examined as a possibility for use in GNSS/INS systems; however, they lack the accuracy due to the short baseline between the pairs of accelerometers when combined in a compact unit for use in a conventional IMU. Conventional MEMS gyroscopic systems often lack the necessary accuracy for modern navigation systems requirements. Further, their relatively high cost often places the use of such MEMS gyroscopes at price points that are unreasonable and/or unfeasible for many navigation applications.

SUMMARY OF THE INVENTION

The disadvantages of the prior art are overcome by combining an accelerometer triad with a GNSS antenna using a long baseline GNSS vector (2-D or 3-D) system. An exemplary accelerometer triad comprises of three orthogonally oriented accelerometers that are arranged to enable measurement of yaw, pitch and roll of the accelerometer triad. Illustratively, a plurality of antenna/accelerometer triad units are attached to a rigid frame with a reasonable antenna separation, e.g., on the order of decimeters. This relatively long baseline length increases the angular rate sensitivity from the accelerometers as well as from the GNSS. The increased angular rate sensitivity provides a better rate stability and performance over equivalently priced gyroscopes. An inertial navigation system performs a double integration of the measured accelerations between GNSS solutions. By utilizing two or more of the combination of accelerometer triad/GNSS antennas, any combination of rotational rate observations may be obtained, including up to six degrees of freedom (DOF). By determining the specific forces and rotation acting on the rigid body, the system may determine the full position, velocity and attitude navigation solution.

BRIEF DESCRIPTION OF THE DRAWINGS

The above and further advantages of the present invention may be further described in relation to the accompanying drawings in which like reference numerals indicate identical or functionally similar elements.

DETAILED DESCRIPTION OF AN ILLUSTRATIVE EMBODIMENT

Figure 1:
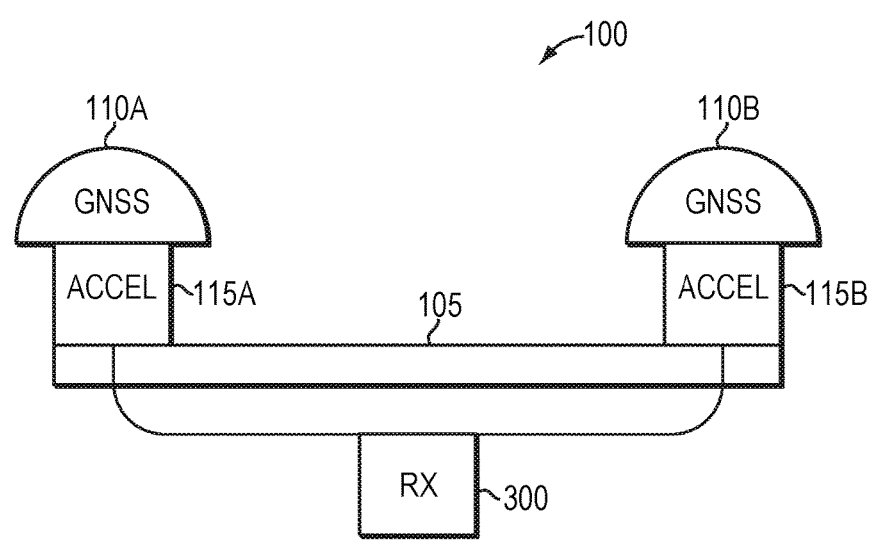
FIG. 1 is a schematic diagram of an exemplary GNSS antenna and accelerometer triad system in accordance with an illustrative embodiment of the present invention.

FIG. 1 is an exemplary perspective diagram of an illustrative antenna/accelerometer triad system 100 in accordance with an illustrative embodiment of the present invention. The antenna/accelerometer system 100 illustratively comprises two GNSS antennas 110 A, B each operatively associated with an accelerometer triad unit 115 A, B that are mounted to a rigid body 105. However, in accordance with alternative embodiment of the present invention, more than two GNSS antenna/accelerometer triad units may be utilized. As such, the description of two GNSS antenna/accelerometer triad units should be taken as exemplary only. The GNSS antennas 110A, B may comprise conventional GNSS antennas that are commonly utilized by those skilled in the art. The accelerometer triad units 115A, B illustratively comprise three accelerometers arranged so that they measure yaw, pitch, and roll rates as well as absolute pitch and roll of the rigid body. The accelerometer triad units 115A, B may illustratively comprise a single unit of three accelerometers. However, in alternative embodiments, a plurality of separate accelerometers may be utilized to form the accelerometer triad unit 115. As such, the description of three separate accelerometers comprising the triad unit should be taken as exemplary only.

Illustratively, the accelerometers are arranged orthogonally so that they may measure acceleration in the X, Y and Z axis as well as provide yaw, pitch and roll rate information. In an exemplary embodiment, they may be arranged along the edges of the GNSS antenna. However, it is expressly contemplated that the accelerometers may be arranged in differing configurations. Information received from the GNSS antennas 110 and the accelerometer triad units 115 are fed into a receiver unit 300, described further below in reference to FIG. 3.

The rigid body 105 may comprise a structural element on which the GNSS antennas and accelerometer triads are mounted. Illustratively, the rigid body 105 may comprise an element of a vehicle (not shown) on which the GNSS/accelerometer triad units are mounted. For example, the rigid body 105 may comprise of the roof of a vehicle that utilizes the GNSS/accelerometer units for navigational information. More generally, the rigid body 105 may comprise any structure that supports the set of GNSS 110 and accelerometer 115 separated by a predefined distance in accordance with illustrative embodiments of the present invention. The set of GNSS 110 and accelerometer triad units 115 needs to be rigid so that any rotation between the two or more sets of GNSS/accelerometer triads is maintained. Thus, for example, a set mounted on separate vehicles would not be operative. However, sets mounted on a common roof of a vehicle, etc. that provides rotational consistency may be utilized in accordance with exemplary embodiments of the present invention. As such, the description of the rigid body 105 being a separate component from a vehicle, etc. should be taken as exemplary only. More generally, the rigid body 105 comprises any device or construct that supports the set of GNSS/accelerometer triads at a predefined distance apart. For example, in alternative embodiments, the GNSS/accelerometer triad units may be located on separate mounts that are a predefined distance away from each other. As noted above, such separate mounts must be rotationally linked to each other. That is, there must be a rigid and persistent relationship between the two sets of mounts to ensure rotational consistency among the steps through various degrees of freedom.

During operation, the system computes a precise baseline vector between the at least two GNSS antennas 110A, B along the rigid body 105 to provide a two (or three) dimensional attitude solution. Roll and pitch information may be computed directly from the accelerometer data by modeling the gravity vector. The system may then remove the effects of gravity and other errors to obtain a measurement of the acceleration and rotation acting on the system 100. By performing a double integral on the accelerometer data, update position solutions may be determined between available GNSS solutions.

Figure 2:
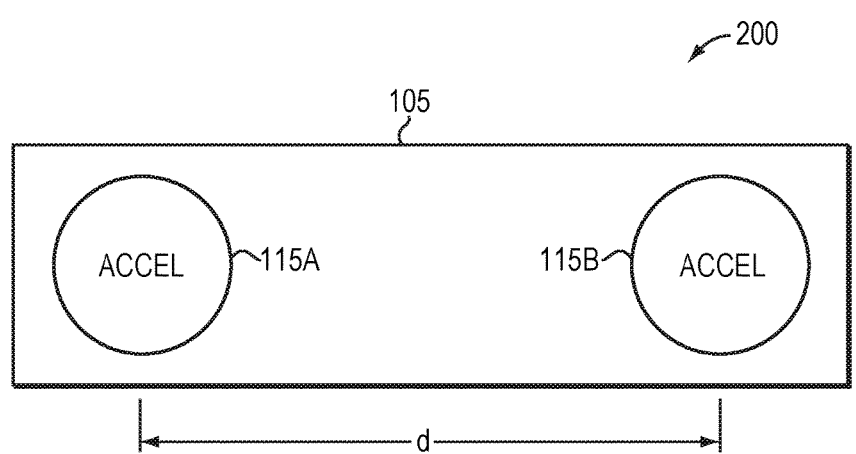
FIG. 2 is a schematic diagram illustrating the exemplary spacing between accelerometer triad/GNSS antenna systems in accordance with an illustrative embodiment of the present invention.

FIG. 2 is a schematic diagram illustrating the exemplary spacing between accelerometer/antenna systems in accordance with an illustrative embodiment of the present invention. As shown in FIG. 2, the rigid body 105, which is illustratively displayed as a rectangular structure supports a pair of accelerometer triad units 115A, B separated by a distance d. However, it should be noted that in alternative embodiments of the present invention, more than two GNSS/accelerometer triad units may be utilized mounted to a three dimensional rigid structure(s). Illustratively, when more than two GNSS antenna/accelerometer units are utilized in alternative embodiments, they may be arranged orthogonally. In accordance with an illustrative embodiment of the present invention, the distance d is on the order of decimeters. However, it should be noted that in alternative embodiments of the present invention, the distance's order of magnitude may differ. As such, the description of a decimeter order of magnitude separation between accelerometer triad units should be taken as exemplary only. As will be appreciated by those skilled in the art, the required or desired separation may vary depending upon the sensitivity of the accelerometers and/or the frequencies involved with the GNSS system. For example, more precise GNSS systems may require a smaller amount of separation. Similarly, more accurate accelerometer triads may require less of a separation. Thus, developing a desired separation may be based on design choices based on required size, cost, etc.

The system 100 encompasses the rigid body to enable rotational solutions to be determined based on the two accelerometer triads. Further, a baseline vector may be computed using, e.g., carrier phase observations, between the two GNSS antenna connected to the rigid body 105.

Figure 3:
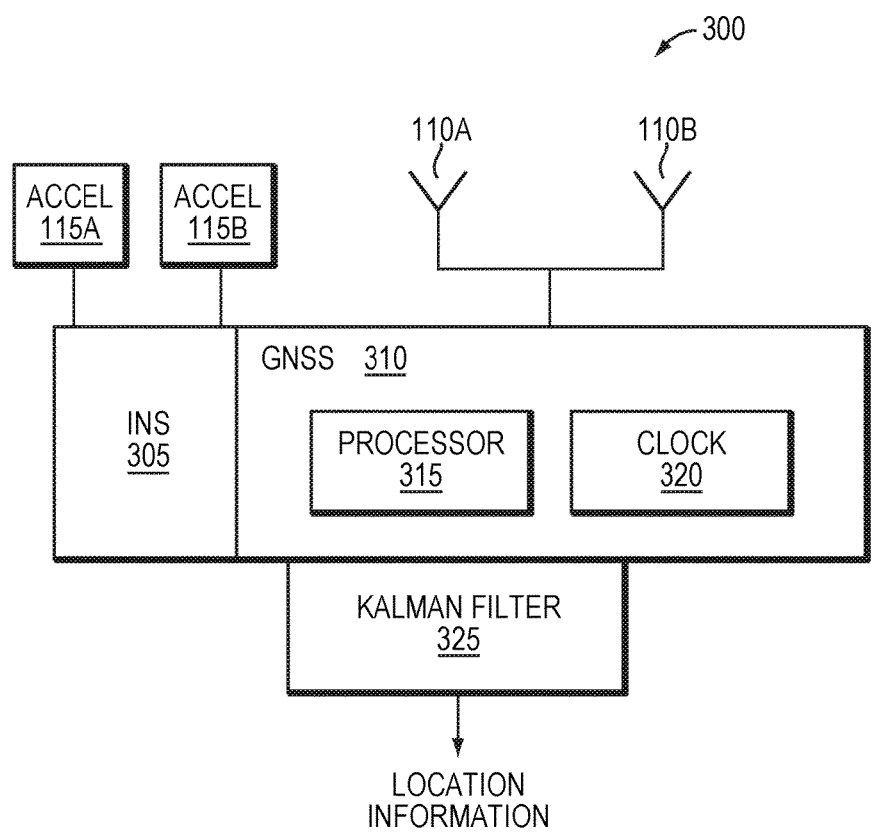
FIG. 3 is a schematic diagram of an exemplary navigation location system utilizing accelerometer triad/GNSS antenna pairs in accordance with an illustrative embodiment of the present invention.

FIG. 3 is an exemplary schematic diagram of an exemplary navigation/location system 300 in accordance with an illustrative embodiment of the present invention. Illustratively, the system 300 is embodied as a GNSS subsystem 310 operatively interconnected with an INS subsystem 305 in accordance with an illustrative embodiment of the present invention. The GNSS subsystem 310 and INS subsystem 305 operate under the control of a processor 315 to calculate the GNSS and INS positions, as well as appropriate velocity, pitch, yaw and roll information. The GNSS subsystem 310 processes satellite signals received over antennas 110 A, B. The INS system receives measurements from accelerometer triads 115A, B comprising data from the exemplary orthogonally positioned accelerometers. The INS system may perform a mechanization process, described further below, to obtain location and rotational information using the accelerometer data. The data from the accelerometer triads is time tagged by the GNSS clock 320. The GNSS and INS systems can thus reliably interchange position related information that is synchronized in time. The two systems are illustratively operated together, through software integration in the processor 315 to enable position and navigation related information to be shared between the two systems. For ease of understanding, the description of the processing operation of the two systems are made without specific reference to the processor 315. The system may, in alternative embodiments, instead include dedicated GNSS and INS sub processors to communicate with one another at appropriate times to exchange information that is required to perform the various GNSS and INS calculations operations discussed below. For example, the INS processor may communicate with the GNSS processor when INS data is provided to the sub processor in order to time tag the data with GNSS time. Further, the GNSS sub processor communicates with the INS of processor to provide GNSS position information at the start of measurement intervals and so forth.

At start up, the GNSS system operates in a known manner to acquire the signals from at least a minimum number of GNSS satellites to calculate pseudo-ranges to the respective satellites. Based on the pseudo-ranges, the GNSS system determines its position relative to the satellites. The GNSS system may also determine its position relative to a fixed position-based receiver (not shown) in the use of differential correction measurements generated at the base station. At the same time, the INS system processes the accelerometer data, that is, the measurements from the various accelerometers to determine inertial location/navigation information. The INS system further processes both the INS data and the GNSS position and associated covariance information to set up various matrices for a Kalman filter 325. At the start of each measurement interval, the INS subsystem updates the Kalman filter and provides updated error states to a mechanization process. The mechanization process uses the updated information and the INS data to propagate, over the measurement interval, the inertial position, attitude and velocity with the inertial position and other system element errors being controlled with GNSS positions at the start of the measurement interval.

At startup, the INS system determines which accelerometers are present and connected to the processor in order to ensure that the INS measurements are scaled correctly.

A generic Kalman filter processes estimates a series of parameters that describe and predict behavior of the system. The Kalman filter operates with a set of state variables that describe errors in the system and associated variants covariance matrix that describes the current knowledge level of the states. The Kalman filter maintains an optimal estimate of system errors and associated covariance over time in the presence of external measurements to the use of propagation and updating processes. To propagate the state and covariance from some past time to the current state what time, the Kalman filter propagation and uses knowledge of the state dynamic behavior determined from the physics of the system and the stochastic characteristics of the system over time. Kalman filter updates use the linear relationship between the state and observation vectors in conjunction with the covariance matrices related to those factors to determine corrections to both the state sector in the state covariance vector.

In accordance with an illustrative embodiment of the present invention, accelerometer data is collected and utilized to compute pitch and roll information by the modeling of the gravity vector. Yaw and pitch rate information is illustratively computed by differencing like sensors across the baseline(s). In embodiments that utilize three or more GNSS antenna/accelerometer triad units, yaw, pitch and roll information may be directly observable from the differential accelerometer data across the baseline(s). Illustratively, in such embodiments, at least three of the GNSS antenna/accelerometer triad units would be mounted in an orthogonal manner.

The accelerometer data is further integrated to obtain solutions between available GNSS solutions. These accelerometer based solutions are fed into the Kalman filter to obtain navigation and location information. Further, the INS 305 may compute the a position, velocity and attitude navigation of the rigid body from the specific forces acting on the rigid body.

Figure 4:
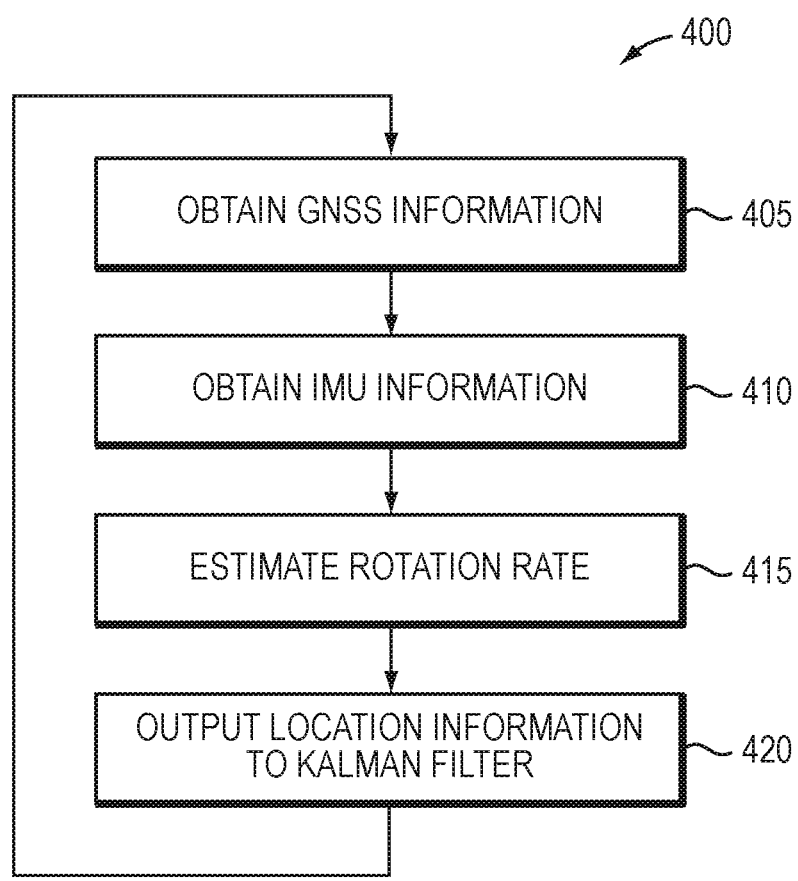
FIG. 4 is a flowchart detailing the steps of an exemplary procedure for identifying location information utilizing accelerometer triad/GNSS antenna pairs in accordance with an illustrative embodiment of the present invention.

FIG. 4 is a flowchart detailing the steps of a procedure 400 for computing location information in accordance with an illustrative embodiment of the present invention. The procedure begins in step 405 where the system obtains GNSS location information. Illustratively, the GNSS information may be obtained by analyzing the appropriate GNSS satellite signals received at antennas 110 A, B and processed by the GNSS subsystem 310. In accordance with alternative embodiments of the present invention, the GNSS subsystem 310 may include various features, such as, multipath detection, etc. that may be utilized to improve the GNSS location information.

Inertial motion unit information is then obtained in step 410. This may be obtained by collecting accelerometer data from the accelerometer triads 115 A, B. The rotation rate is then obtained in step 415. The rotation rate may be obtained by analyzing the forces measured along the rigid body from the two accelerometer triads 115A, B. Roll and pitch information may be computed directly from the accelerometer data. The INS then removes the effects of gravity and other errors to obtain a measurement of the acceleration and rotations acting on the rigid body. This rotational information may then be utilized for navigation/location purposes.

Illustratively, the mechanization process may be utilized to convert the raw accelerometer data into navigation information. This mechanization process illustratively uses the conditions associated with the ending boundary of the previous measurement interval, and propagates the position, velocity and attitude to the end of the current measurement interval. Illustratively, is done using the delta velocities and delta angles in the solution of the fundamental differential equations, as is known to those skilled in the art and as are commonly illustrated by publications involving INS/GNSS integration for geodetic applications:

$$\frac{dR_b^e}{dt} = R_b^e(\Omega_{ei}^b + \Omega_{ib}^b)$$

And $$\frac{d^2 r^e}{dt^2} = R_b^e f^b + g^e - 2\Omega_{ie}^e \frac{dr^e}{dt}$$

The first differential equation maintains the attitude relationship between the reference, or body, frame and the computational frame (ECEF in this case). The $R_b^e$ transformation matrix is maintained with the following quaternion elements and is recomputed at the IMU sampling rate.

$$R_b^e = \begin{bmatrix} r_{11} & r_{12} & r_{13} \\ r_{21} & r_{22} & r_{23} \\ r_{31} & r_{32} & r_{33} \end{bmatrix} =$$

$$\begin{bmatrix} q_1^2 - q_2^2 - q_3^2 + q_4^2 & 2(q_1 q_2 - q_3 q_4) & 2(q_1 q_3 + q_2 q_4) \\ 2(q_1 q_2 + q_3 q_4) & q_2^2 - q_1^2 - q_3^2 + q_4^2 & 2(q_2 q_3 + q_1 q_4) \\ 2(q_1 q_3 + q_2 q_4) & 2(q_2 q_3 + q_1 q_4) & q_3^2 - q_1^2 - q_2^2 + q_4^2 \end{bmatrix}$$

The second differential equation maintains the relative position and velocity. The $2^{nd}$ order equation can be used to generate two first order equations by introducing velocity, $v^e$.

$$\frac{dr^e}{dt} = v^e$$

$$\frac{dv^e}{dt} = R_b^e f^b + g^e - 2\Omega_{ie}^e \frac{dr^e}{dt}$$

In the equation for $$\frac{dv^e}{dt},$$

the effects of gravity and the Coriolis force may be removed from the measured specific forces transformed to the computation (ECEF) frame by substituting $$f^e = R_b^e f^b$$

The angular rates are derived from the basic rigid body kinematic equation using two points, P and Q as is described in *Dynamics, Theory and Applications*, by Kane, T. R. and D. A. Levinson (1985).

$$v^P = v^Q + \omega \times r$$

The angular acceleration, α, of the rigid body is determined by the relationship between the acceleration, $a^P$, of P and the acceleration, $a^Q$, of Q.

$$a^P = a^Q + \omega \times (\omega \times r) + \alpha \times r$$

$$v^P = \frac{dp}{dt} = \frac{d}{dt}(q + r) = \frac{dq}{dt} + \frac{dr}{dt} = v^Q + \omega \times r$$

$$a^P = \frac{dv^P}{dt} = \frac{dv^Q}{dt} + \frac{d\omega}{dt} \times r + \omega \times \frac{dr}{dt} = a^Q + \alpha \times r + \omega \times (\omega \times r)$$

Where,
 $a^X$—acceleration of point X, in the b-frame,
 α—angular acceleration vector of body,
 r—position vector of point P relative to Q, in the b-frame, and
 ω—angular velocity of the body.

The location information is then output to a Kalman filter step 420. That is, GNSS information, the accelerometer information and the computed information from the accelerometer information (e.g., rotation rate, etc.) are fed into the Kalman filter. Lastly, the Kalman filter utilizes the various input information to generate location information that is an output for use by other components (not shown). The procedure then loops back to step 405 for the next iteration.

It should be noted that while this invention has been described in terms of feeding the accelerometer and related information into a Kalman filter for processing, the principles of the present invention may be utilized in other environments. As such, the system described herein should be taken as exemplary only. It is expressly contemplated that the principles of the present invention may be utilized in systems with accelerometer triads mounted to a rigid body but not integrated with a Kalman filter, etc.

While the present invention has been described in terms of hardware, or of various components performing certain operations, it should be noted that these various procedures may be implemented in hardware, software, firmware or a combination thereof. Therefore, be description of certain elements being performed in software, hardware, etc. should be taken as exemplary only. Further, as will be appreciated by those skilled in the art, variations for alternative embodiments of those described herein may be utilized without departing from the spirit and/or scope of the present invention.

What is claimed is:

1. A system comprising:
    a first assembly comprising a first global navigation satellite system (GNSS) antenna operatively associated with a first accelerometer set;
    a second assembly comprising a second GNSS antenna operatively associated with a second accelerometer set;
    a rigid body that is operatively connected to the first assembly and the second assembly, wherein the first and second assemblies are separated by a predefined distance, whereby movement of the rigid body causes both the first and second assemblies to move; and
    a processor configured to computer a baseline vector between the first and second assembly and further configured to compute rotational information using data from the first and second accelerometer sets.

2. The system of claim 1 wherein the first accelerometer set comprises a trio of orthogonally oriented accelerometers.

3. The system of claim 1 wherein the second accelerometer set comprises a trio of orthogonally oriented accelerometers.

4. The system of claim 1 wherein the processor is further configured to compute the baseline vector using carrier phase observations.

5. The system of claim 1 wherein the processor is further configured to compute roll, pitch and yaw information from data from the first and second accelerometer sets.

6. The system of claim 1 wherein the processor calculates the rotational information after elimination of errors from the data from the first and second accelerometer sets.

7. The system of claim 1 further comprising:
    a third assembly comprising a third global navigation satellite system (GNSS) antenna operatively associated with a third accelerometer set;
    wherein the rigid body is operatively connected to the thirds assembly, wherein the first assembly, the second assembly and the third assembly are arranged in an orthogonal manner, whereby movement of the rigid body causes the first, second, and third assemblies to move; and
    wherein the processor is further configured to compute the rotational information using data from the first, second, and third accelerometer sets.

8. A system comprising:
    a plurality of assemblies, each of the plurality of assemblies comprising a global navigation satellite system (GNSS) antenna operatively associated with an accelerometer set;
    a rigid body that is operatively connected to the plurality of assemblies, wherein each of the plurality of assemblies are separated are separated by a predefined distance, whereby movement of the rigid body causes each of the plurality of assemblies to move; and
    a processor configured to computer baseline vectors among the plurality of assemblies and further configured to compute rotational information using data from the plurality of accelerometer sets.

* * * * *